United States Patent Office 3,553,817
Patented Jan. 12, 1971

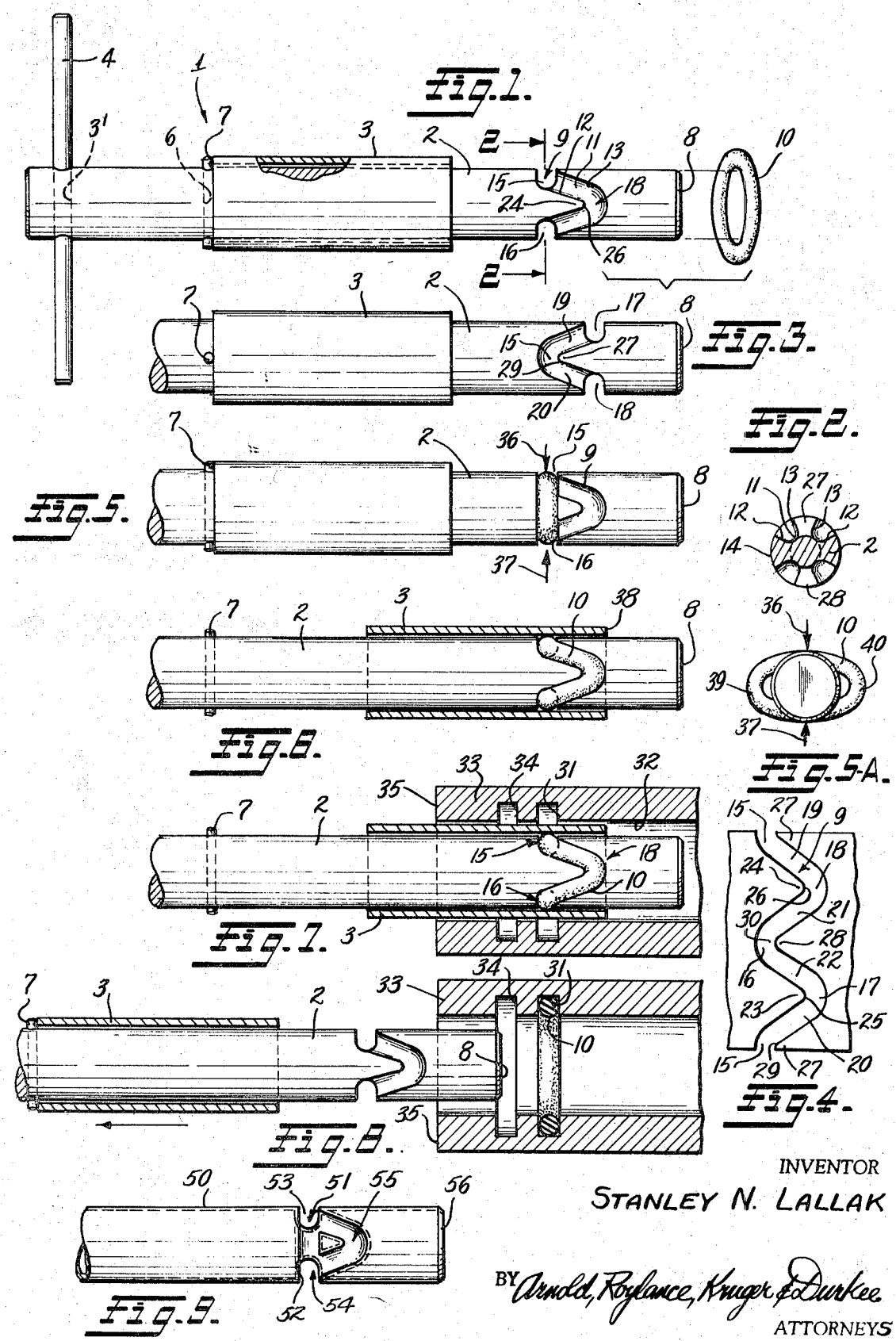

3,553,817
TOOL FOR INSTALLING RESILIENT SEALS
Stanley M. Lallak, 315 W. 1st St.,
Washington, Kans. 66968
Filed Apr. 10, 1968, Ser. No. 720,213
Int. Cl. B23p 19/00
U.S. Cl. 29—235          9 Claims

ABSTRACT OF THE DISCLOSURE

An O-ring installing tool of simple construction including only a mandrel and a retaining sleeve slideable along the mandrel. A generally W-shaped groove is formed near the forward end of the mandrel to accommodate an O-ring in the groove. The O-ring is positioned in the groove by squeezing its sides diametrically in a first pair of pockets and then folding the O-ring in a direction toward the front end of the mandrel while sliding the sleeve over the O-ring positioned in the groove. Then, it is a simple matter to insert the tool into a bore and accurately align and seat the O-ring in any desired recess by merely sliding the sleeve away from the groove to allow the resiliency of the O-ring to snap itself into the recess. The tool has a handle to facilitate its manipulation, and a stop pin spaced from the handle prevents injury to the fingers of the user of the tool when the sleeve is pulled rearwardly to release the O-ring.

---

This invention relates to a tool for installing resilient or elastic seals and particularly to a tool for installing resilient O-rings.

Specifically, the invention relates to a tool for installing resilient or elastic O-rings in a recess in a bore, and more particularly to a tool for installing O-rings in an annular recess intermediate the ends of a bore.

O-rings, customarily used as seals where a shaft extends through a bore are frequently located in an internal annular recess of the bore. While the exact position of the recess of the bore is, of course, determined by the structure of the device in which the O-ring is used, the recess is frequently located at a position intermediate the ends of the bore and there may be several additional recesses in the bore between an accessible end of the bore and the recess into which the O-ring must be placed.

Because O-rings are quite inexpensive all O-rings should be replaced each time a machine or mechanism is dismantled for maintenance. However, in a small repair shop where elaborate and expensive O-ring installing devices of the prior art are not available, O-rings are frequently not replaced, or they are replaced at great expense because of the difficulty of manually inserting and aligning the O-ring with the proper recess by using wires, mandrels, or any other available tools which the mechanic feels he will be successful with in installing the O-ring.

Applicant, with this invention, provides an O-ring installing tool which facilitates installing an O-ring in an internal recess of a bore quite rapidly, even where several additional recesses are located between the end of the bore and the recess into which the O-ring is to be installed. A unique feature of the O-ring installing tool is its simplicity, requiring only one movable part which is slideable along an elongated O-ring supporting tool. Advantageously, both the movable part, which takes the form of a retaining member or sleeve for the O-ring, as well as the elongated support member for the O-ring are formed from sheet metal or rigid molded plastic. Thus, the tool can be mass produced to sell at a price sufficiently low that even the "handyman" homeowner will purchase one merely to have it available in the event that such a tool is ever required. Naturally, a small repair shop can afford such a tool since it pays for itself in time saved, the first time the tool is used.

Numerous features and advantages of the O-ring installing and inserting tool of this invention will become apparent with reference to the drawings which form a part of this specification and in which:

FIG. 1 is a side elevational view of the tool with the O-ring that is installed by the tool shown pictorially;

FIG. 2 is a view in section taken along lines 2—2 of FIG. 1;

FIG. 3 is a top plan view of the tool of FIG. 1;

FIG. 4 is a displacement or generated view of the O-ring retaining groove;

FIG. 5 is a side elevational view showing the O-ring squeezed diametrically into the opposed recesses of the tool;

FIG. 5A is a righthand end view of the tool and O-ring of FIG. 5;

FIG. 6 is a view corresponding to FIG. 5 showing the sleeve in position to retain the retaining O-ring on the tool;

FIG. 7 is a side elevational view with portions thereof in section showing the positioning of an O-ring retained by the rod adjacent a recess in a bore;

FIG. 8 is a side elevational view showing the O-ring positioned in the recess, and the tool being removed from the bore; and FIG. 9 is a side elevational view showing a second embodiment of the tool of this invention.

Referring now to the drawings in detail and particularly to FIGS. 1 and 3 there is shown O-ring installing tool 1 in accordance with this invention, the tool including an elongated cylindrical O-ring supporting mandrel 2 and a thin walled sleeve 3 slideable along the mandrel. Adjacent one end of mandrel 2 is a transverse opening 3' into which a handle 4 in the form of an elongated bar, is inserted to facilitate handling the tool.

A second transverse opening 6 spaced slightly from handle 4 in a direction toward forward end 8 of the mandrel, has inserted therein a stop-pin 7 which is secured against removal.

Formed in mandrel 2 at a location spaced from forward end 8 is an O-ring retaining groove 9 which receives O-ring 10 in a manner which will subsequently be described in detail. Groove 9 extends around mandrel 2 in a generally zig-zag or W-shape configuration as shown at FIGS. 1, 3 and 4. For purposes of explanation, mandrel 2 is shown at FIG. 4 in an unrolled flattened condition such as would be obtained by slicing one side of the mandrel longitudinally and then unrolling same to a flattened condition.

As shown at FIGS. 1–4, groove 9 has a semi-circular bottom 11 and side walls 12 and 13 which are tangential to and extend radially outwardly from curved bottom 11 and terminate at outer cylindrical surface 14 of the mandrel. Advantageously, the depth of groove 9 as measured from cylindrical surface 14 to the innermost portion of bottom 11 equals the thickness of O-ring 10.

Groove 9 is so formed that a pair of diametrically opposed pockets 15 and 16 form the portions of the groove closest to handle 4 and a second pair of diametrically opposed pockets 17 and 18 form the portions of groove 9 nearest forward end 8. It will be observed with reference to FIGS. 1–3, that pockets 15 and 16 lie in a plane perpendicular to the axis of mandrel 2, and similarly, pockets 17 and 18 lie in a plane perpendicular to the axis of mandrel 2 but are spaced from pockets 15 and 16 longitudinally of the mandrel.

Pocket 15 communicates with pocket 17 via a leg 19 of the groove. Pocket 15 communicates with pocket 18 via a leg 20 of the groove. Similarly, pocket 16 communicates with pocket 18 via leg 21 of the groove and pocket 16 communicates with pocket 17 via leg 22 of the groove.

Groove 9 is so formed that there is a nose 23 at pocket 17 and a nose 24 at pocket 18. The side wall of groove 9 adjacent nose 23 forms a forwardly facing surface 25 and the portion of groove 9 at nose 24 forms a similar forwardly facing surace 26.

There is also a nose 27 at pocket 15 and a nose 28 at pocket 16. The portion of groove 9 adjacent nose 27 presents a surface 29 which faces away from front end 8 and the portion of groove 9 adjacent nose 28 presents a surface 30 which also faces away from front end 8. Surfaces 25, 26 and 29, 30 function as retaining or stop surfaces to prevent movement of an O-ring positioned in groove 9. The manner in which these surfaces perform their retaining function will subsequently be described in detail.

Installing tool 1 has particular utility for installing the resilient or elastic O-ring 10 in an internal annular recess 31 of a bore 32 of a workpiece 33 (FIGS. 7 and 8). As shown at FIG. 8, O-ring 10 when seated in recess 31 extends slightly inwardly of the surface of bore 32 so it accomplishes a sealing function by engagement with a shaft (not shown) which forms part of the apparatus to be repaired and which is inserted in bore 32 to assemble the apparatus. Depending on the construction of workpiece 33, there may be an additional recess 34 between accessible end 35 of the workpiece and recess 31 into which O-ring 10 is to be installed. It will be appreciated that a recess such as the recess 34 makes it extremely difficult to position O-ring 10 in its proper recess 31 using non-specialized tools like wires or screwdrivers in an attempt to seat the O-ring in the proper groove.

A basic characteristic of installing tool 1 of this invention is that O-ring 10 is loaded into the tool by squeezing diametrically opposed portions of the O-ring into pockets 15 and 16 of the tool. This is accomplished as shown at FIGS. 5 and 5A wherein arrows 36 and 37 represent pressure applied to diametrically opposed sides of O-ring 10 to seat the O-ring in pockets 15 and 16. Next, sleeve 3 is moved from its normal position in which it rests against stop pin 7 to its retaining position in which the sleeve completely covers groove 9 (FIG. 6). During such movement, pressure is maintained on the O-ring in the direction of arrows 36, 37 until forward end 38 of sleeve 3 at least partially extends over the portions of the O-ring in pockets 15 and 16. Then, pressure in the direction of arrows 36 and 37 is released, and the exposed sides 39 and 40 of the O-ring are pushed forwardly into pockets 17 and 18, which can readily be accomplished by the fingers of the person manipulating the O-ring. Then, sleeve 3 is moved forwardly to the position of FIG. 8 in which end 38 extends at least over the portion of groove 9 closest to front end 8. During the forward folding of portions 39 and 40 of O-ring 10 it will be appreciated that stop surfaces 29 and 30 adjacent noses 27 and 28 respectively retain the portions of the O-ring in pockets 15 and 16 against forward movement toward front end 8 of the mandrel. While O-ring 10 can be folded into pockets 17 and 18 from its elliptical shaped position of FIGS. 5 and 5A in which pressure is applied in a direction of arrows 36 and 37 merely by sliding sleeve 3 forwardly, it is preferred to fold portions 39 and 40 of the O-ring into pockets 17 and 18 to avoid any scoring or gouging of the O-ring by forward end 38 of sleeve 3.

With the O-ring in the retained position of FIG. 6 it is a relatively easy matter to install the O-ring in annular groove 31 of the workpiece 33. First, handle 4 is grasped and the tool with sleeve 3 in its retaining position is inserted into bore 32 of the workpiece 33 to the position shown at FIG. 7 in which the portion of O-ring 10 in pockets 15 and 16 is transversely aligned with annular recess 31. Next, sleeve 3 is moved rearwardly by grasping the end of the sleeve exposed outside workpiece 33 and pulling on the sleeve. As the sleeve is moved, the frictional resistance between the inside surface of the sleeve and the O-ring may be substantial and thus, to avoid pinching the fingers of the user between the end of sleeve 3 and handle 4, stop pin 7 performs its function of limiting the distance that sleeve 3 can be moved toward the handle. As sleeve 3 is moved rearwardly toward handle 4, stop surfaces 25 and 26 prevent any movement of O-ring 10 in a direction away from front end 8 of the mandrel. As the sleeve is moved rearwardly the portions of the O-ring in pockets 17 and 18 release the O-ring and when the sleeve is fully removed from around groove 9, the portions of the O-ring in pockets 15 and 16 snap outwardly into the recess 31. In the event that O-ring 10 is not fully seated after merely moving sleeve 3 rearwardly against stop pin 7, gently withdrawing mandrel 2 from bore 32 will cause the ring to position itself in the recess 31. In this regard, it will be noted that the annulus between mandrel 2 and bore 32 is smaller than the thickness of O-ring 10, and thus, the O-ring cannot fully flex out of pockets 17 and 18, even after sleeve 3 is withdrawn. Thus, gently withdrawing the mandrel allows the side edge of pocket 18 to move forward portions 39 and 40 of the O-ring in a direction toward recess 31 with the result that the O-ring can snap into the recess by virtue of its resiliency.

Since sleeve 3 presents a smooth outside surface after the O-ring is in its retained position of FIGS. 6 and 7, any recesses such as recess 34 between the recess 31 into which the O-ring is installed and accessible end 35 of bore 32 of the workpiece presents no problems in installing the O-ring. Should it be necessary to install several O-rings in the same bore, it is preferred that an O-ring be installed first in the recess furthest from the accessible end of the bore. Then, O-rings can be installed in the additional recesses in sequence from the first O-ring in a direction toward the accessible end.

Referring now to FIG. 9, there is shown a somewhat modified second embodiment of the installing tool of this invention. The second embodiment includes a mandrel 50 having a groove 51 which is slightly different from the groove 9 of mandrel 2. In this embodiment, a transverse annular groove 52 extends completely around mandrel 50 so that pockets 53 and 54 are continuous and merge into each other. The pockets 55 nearest to front end 56 of the mandrel are precisely the same as pockets 17 and 18 previously described for mandrel 2. In addition, the legs 56 which connect between pockets 55 and pockets 52 and 53 respectively are precisely the same as the legs 19–22 previously described for mandrel 2. It has been found that annular groove 51 facilitates manufacturing the mandrel portion of the tool when formed from plastic by such processes as blow molding or injection molding. The mold in both instances is substantially easier to manufacture. In addition, as shown, mandrel 50 is formed from thin walled sheet metal. Thus, the groove array of mandrel 50 can be formed by stamping either while the sheet metal is in a flattened condition whereupon the sheet metal is then rolled to form the mandrel 50, or can be formed in the sheet metal after it is rolled by conventional stamping processes. In addition, mandrel 9 may be formed from two separate semi-circular halves into which proper portions of the groove array have been stamped, and then the halves are mated together and secured to each other by spot welding.

With further reference to supporting mandrel 2, it is to be noted with particularity that the mandrel is of unitary one-piece construction which is quite inexpensive to manufacture. With mandrel 2 in the position of FIG. 1 it is to be noted with particularity that pockets 15 and 16 are diametrically opposed and lie in a common vertical plane passing through the axis of supporting mandrel 2. On the other hand, pockets 17 and 18, with the supporting mandrel 2 in the position of FIG. 1 are also diametrically opposed but lie in a common horizontal plane passing through the axis of the supporting mandrel. Thus, it is apparent that pockets 17 and 18 are each shifted 90° circumferentially from pockets 15 and 16. In addition, connecting legs 19–22 of groove 9 each lie in planes which are oblique to the axis of supporting mandrel 2. It will also be appreciated in view of the foregoing explanations that O-ring installing tool 1 is particularly adapted to install an O-ring of an inside diameter somewhat less than the outside diameter of supporting mandrel 2 in an internal annular recess of a bore of a workpiece.

Although the preferred embodiment shown and described is preferably formed from sheet metal or plastic materials in the manner mentioned, it is within the contemplated scope of this invention to form the mandrel from iron or steel bar stock suitably machined to provide the desired groove array to retain the O-ring for positioning.

While two preferred embodiments are shown and described herein, it is contemplated that numerous changes and modifications can be made to the embodiments described without departing from the scope of this invention as stated and described herein and in the appended claims.

I claim:
1. An O-ring installing tool comprising:
an elongated mandrel of unitary construction including
a rear portion, and
a front portion having a cylindrical surface;
a first pair of outwardly facing transversely aligned indentations formed in opposite sides of the mandrel, said indentations being axially spaced from said front portion of said mandrel;
a second pair of outwardly facing transversely aligned indentations formed in opposite sides of said mandrel, said second pair of indentations being spaced axially and circumferentially from said first pair of indentations; and
means movable axially along said mandrel
to a first position to retain an O-ring in said first said second indentations, and
to a second position spaced from said indentations whereby an O-ring on the mandrel is free to expand radially.

2. An O-ring installing tool according to claim 1 wherein:
said first indentations lie in a vertical plane passing through the axis of the mandrel; and
said second indentations lie in a horizontal plane passing through the axis of the mandrel.

3. An O-ring installing tool according to claim 2 which further includes:
means interconnecting each of said first indentations with each of said second indentations.

4. An O-ring installing tool according to claim 3 wherein:
said means interconnecting each of said first indentations with each of said second indentations comprises
a plurality of grooves formed in the surface of said mandrel extending obliquely of said mandrel, one between each of said first and second indentations; and
said indentations and grooves each have a depth approximately equal to the thickness of an O-ring to be installed with the tool.

5. An O-ring installing tool according to claim 1 wherein:
said means movable axially along said mandrel to retain an O-ring comprises
a sleeve of a length shorter than said mandrel;
said sleeve having an inside diameter only slightly larger than the outside diameter of said mandrel; whereby said sleeve is freely slidable between said first and second positions.

6. An O-ring installing tool according to claim 5 which further includes:
stop means spaced from said handle and effective to prevent engagement of said sleeve with said handle;
whereby, pinching of the fingers of the user holding the tool by its handle is prevented during movement of said sleeve from its first position to its second position.

7. A tool to insert an O-ring into an internal recess in a workpiece comprising, in combination,
a unitary, elongated O-ring supporting member having a cylindrical forward portion and a rear portion integral with said forward portion;
at least said forward portion having a transverse dimension less than the diameter of the bore adjacent the recess into which the O-ring is installed;
said forward portion of said supporting member having an O-ring receiving groove therein, at least a portion of said groove lying in a plane oblique to the axis of the support member, and a portion of said groove lying in a plane normal to the axis of said support member; and
retaining means slidable along and extending around said supporting member, said retaining means being movable to
a first position in which said retaining means engages and maintains an O-ring in said groove, and
a second position in which said retaining means is spaced from said groove and the O-ring is free to expand radially;
whereby an O-ring disposed in said groove and maintained therein by said retaining means is readily positioned in alignment with an internal recess into which the O-ring is to be inserted whereupon, movement of said retaining means to its second position releases the O-ring to expand into the recess.

8. An O-ring inserting tool according to claim 7 wherein:
said portion of said groove lying in a plane normal to the axis of said support member includes
a first portion, and
a second portion diametrically opposed to said first portion;
and wherein at least said portion of said groove lying in a plane oblique to the axis of the support member includes
a plurality of groove legs extending from each of said grooves in a direction oblique to the axis of said supporting member, said groove legs interconnecting said grooves.

9. An O-ring inserting tool according to claim 7 wherein:
said groove is of a generally W-shaped configuration and extends circumferentially completely around the supporting member.

References Cited
UNITED STATES PATENTS

| | | | |
|---|---|---|---|
| 3,180,015 | 4/1965 | Thompson | 29—235 |
| 3,406,441 | 10/1968 | Larsson | 29—235X |
| 3,455,011 | 7/1969 | Harding | 29—235 |

ROBERT C. RIORDON, Primary Examiner

J. C. PETERS, Assistant Examiner

U.S. Cl. X.R.

29—278